(12) United States Patent
Ouazzani et al.

(10) Patent No.: US 6,475,387 B1
(45) Date of Patent: Nov. 5, 2002

(54) MICROBIOLOGICAL METHOD FOR ELIMINATING A NITROAROMATIC COMPOUND

(75) Inventors: Jamal Ouazzani, Massy (FR); Laurence Le Campion, Monts (FR)

(73) Assignees: Commissariat a l'Energie Atomique, Paris (FR); Centre National de la Recherche Scientifique, Paris (FR)

(*) Notice: Subject to any disclaimer, the term of this patent is extended or adjusted under 35 U.S.C. 154(b) by 0 days.

(21) Appl. No.: 09/787,915

(22) PCT Filed: Sep. 29, 1999

(86) PCT No.: PCT/FR99/02314

§ 371 (c)(1),
(2), (4) Date: May 23, 2001

(87) PCT Pub. No.: WO00/18693

PCT Pub. Date: Apr. 6, 2000

(30) Foreign Application Priority Data

Sep. 30, 1998 (FR) ............................................ 98 12237

(51) Int. Cl.$^7$ .............................. C02F 3/00; C02F 3/34; B09C 1/10
(52) U.S. Cl. ........................ 210/601; 210/612; 210/615; 210/903; 210/909; 435/254.5; 435/262.5; 435/933; 405/128.15
(58) Field of Search ......................... 210/601, 610–612, 210/615, 903, 909; 435/176, 177, 254.5, 262, 262.5, 933; 405/128.1, 128.45, 128.15

(56) References Cited

U.S. PATENT DOCUMENTS 5,376,183 A * 12/1994 Gatt et al.
5,401,413 A * 3/1995 Gatt et al.
5,510,112 A * 4/1996 Gatt et al.

FOREIGN PATENT DOCUMENTS

| DE | 197 07 883 | 9/1998 |
| EP | 0 499 441 | 8/1992 |

OTHER PUBLICATIONS

J. E. Cruz, et al., Abstract of the General Meeting, "TNT Degradation by Fungi Isolated from Explosives–Contaminated Soil", 1992.
M. Hofrichter, et al., Terratech, vol. 4, No. 3, pp. 69–71, "Rolle der Bodenpilze Beim Fremdstoffabbau", 1995.
J. W. Bennett, et al., International Biodeterioration & Biodegradation, vol. 35, No. 4, pp. 421–430, "Isolation of Bacteria and Fungi from TNT–Contaminated Composts and Preparation of $^{14}$C–Ring Labelet TNT", 1995.
T. Kalafut, et al., Current Microbiology, vol. 36, pp. 45–54, "Biotransformation Patterns of 2,4,6–Trinitrotoluene by Aerobic Bacteria", 1998.
C. Vorbeck, et al., Applied and Environmental Microbiology, vol. 64, No. 1, pp. 246–252, "Initial reductive Reactions in Aerobic Microbial Metabolism of 2,4,6–Trinitrotoluene", Jan. 1998.
R. Boopathy, et al., Water Environment Research, vol. 70, No. 1, pp. 80–86, "A Laboratory Study of the Bioremediation of 2,4,6,–Trinitrotoluene–Contaminated Soil Using Aerobic/Anoxic Soil Slurry Reactor", Jan./Feb. 1998.

* cited by examiner

Primary Examiner—David A. Simmons
Assistant Examiner—Fred Prince
(74) Attorney, Agent, or Firm—Oblon, Spivak, McClelland, Maier & Neustadt, P.C.

(57) ABSTRACT

The invention relates to an isolated Penicillium strain capable of eliminating a nitroaromatic compound by mineralization and a microbiological method for eliminating a nitroaromatic compound present in a solution or in a soil.

13 Claims, 2 Drawing Sheets

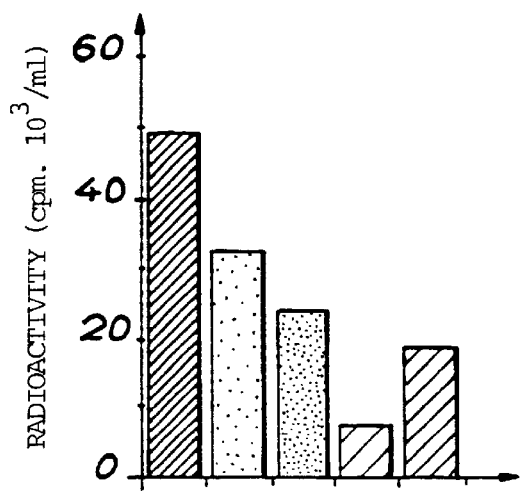
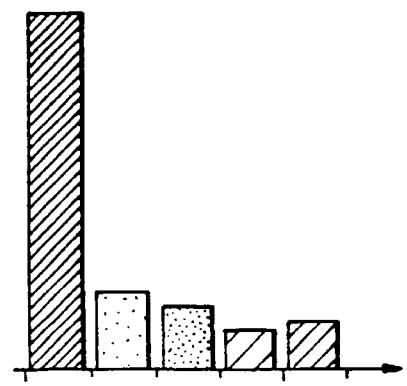
FIG.1A  FIG.1B
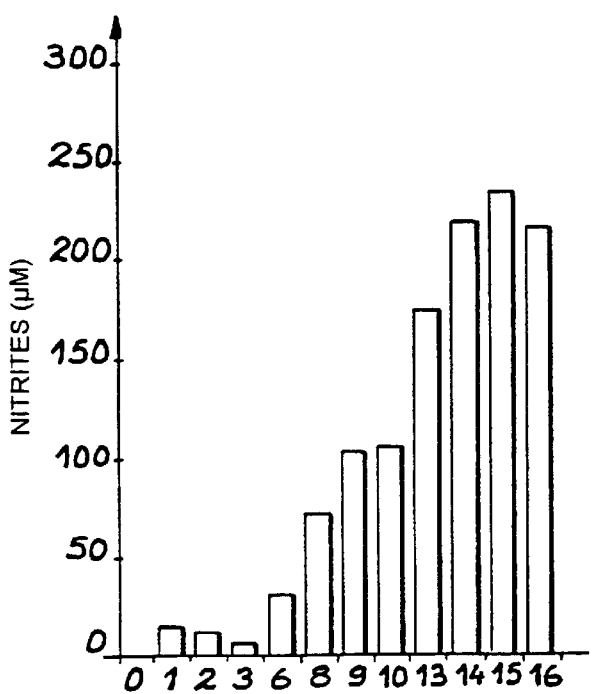
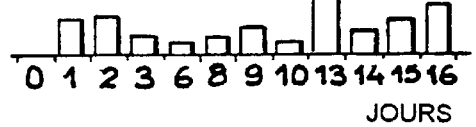
JOURS
FIG.1C  FIG.1D

MICROBIOLOGICAL METHOD FOR ELIMINATING A NITROAROMATIC COMPOUND

DISCLOSURE

1. Field of the Invention

The present invention relates to a microbiological process for eliminating a nitroaromatic compound present in a solution or in a soil, and to a microorganism strain capable of mineralising said nitroaromatic compound.

The method according to the invention is for example very useful for treating a solution, such as an industrial effluent, or a soil, polluted with a nitroaromatic compound, for example with dinitrotoluene (DNT) or trinitrotoluene (TNT).

2. State of the Related Art

Different nitroaromatic compound degradation processes have been studied in the prior art. These processes are essentially either biological or chemical.

For example, in 1998, KALAFUT et al. studied the transformation of TNT by three aerobic bacteria: *Pseudomonas aeruginosa*, Bacillus sp. and Staphylococcus sp. It demonstrated that these three strains transformed TNT but could not use it as the only source of carbon or nitrogen. The study is reported in the document KALAFUT, T et al., "Biotransformation patterns of 2,4,6-trinitrotoluene by aerobic bacteria", Cur. Microbiol., 1998, 36, 45–54.

In 1998, BOOPATHY et al. developed a laboratory-scale aerobic/anoxic bioreactor to decontaminate a soil contaminated with TNT. This method may be carried out in a batch or semi-continuous system. Batch treatment enables TNT transformation, but some metabolites accumulate. However, in semi-continuous mode (regular change of 10% of soil), TNT (8 g/kg of soil) is completely broken down. The balance, after a 14-day incubation period, indicates that only 23% of the TNT was mineralised, 27% assimilated and 8% was adsorbed on the soil. The remaining percentage corresponds to the formation of metabolites such as amino-dinitrotoluenes (4%), 2,4-diamino-6-nitrotoluene (3%) and 2,3-butanediol produced by the splitting of the cycle (30%). Successive additions of soil once, twice or three times a week do not affect the TNT degradation rate. In addition, this reactor makes it possible to maintain the bacterial population, with 0.3% molasses being the only co-substrate required. Using the same method, it is possible to eliminate other soil contaminants, such as hexahydro-1,3,5-trinitro-1,3,4-triazine (RDX), octahydro-1,3,5,7-tetranitro-1,3,5,7-tetrazocine (HMX), trinitrotoluene and 2,4-dinitrotoluene. These results are reported in BOOPATHY, R. et al. "A laboratory study of the bioremediation of 2,4,6-trinitrotoluene-contaminated soil using aerobic/anoxic soil slurry reactor", Water Environment Research, 1998.

In 1998, VORBECK et al. studied the microbiological reduction of TNT nitro groups and the microbiological hydrogenation of the aromatic cycle. Due to electron deficiency caused by the presence of electron-attracting nitro groups, the first microbial transformation of TNT is a nitro-reduction. The hydrogenation of the aromatic cycle described for picric acid remains a minority. Two bacteria were isolated from an aerobic medium, enriched with TNT as the only source of nitrogen: the strain TNT-8 (gram−) and the strain TNT-32 (gram+). They catalyse the nitro-reduction of TNT. However, the strains *Rhodoccus* erythropolis HL PM-1 (growing on picric acid) and Mycobacterium sp. HL 4-NT-1 (growing on 4-nitrotoluene) with enzyme systems which catalyse the hydrogenation of TNT and, consequently, the addition of a hydride ion on the aromatic cycle. The TNT Meisenheimer hydride complex (H-TNT) formed is then converted into a yellow non-degradable metabolite, identified by NMR. In this case, no reductive denitration of the TNT was observed. The mineralisation of TNT was not studied. These results are reported in VORBECK, C. et al., "Initial Reductive reactions in aerobic microbial metabolism of 2,4,6-trinitrotoluene", Appl. Environ. Microbiol., 1998, 64(1), 246–252.

However, none of the micro-organisms described in these documents enable the total or almost total mineralisation of TNT.

Chemical degradation processes, for their part, involve numerous disadvantages related to the use of chemical reagents. These disadvantages particularly include the cost of the chemical reagents and the pollution generated by these reagents in treated solutions and soils.

DESCRIPTION OF THE INVENTION

The specific aim of the present invention is to provide a method enabling the total or almost total elimination of a nitroaromatic compound in a solution or in a soil, by means of the mineralisation of said compound.

In this way, the method according to the present invention is a method which may be used to treat a solution or a soil containing one or more undesirable (due to pollution) nitroaromatic compounds.

The method according to the invention is a microbiological method for eliminating at least one nitroaromatic compound present in a solution or in a soil, said method being characterised in that it comprises contact of said solution or said soil with a biomass of a Penicillium strain under suitable conditions for mineralisation of the nitroaromatic compound by the Penicillium strain.

The terms "nitroaromatic compound" or "nitroaromatic compound solution" below refer to "the nitroaromatic compound(s)" and "solution of the nitroaromatic compound (s)", respectively.

According to the invention, the nitroaromatic compound solution may be, for example, a laboratory solution, an industrial effluent or surface water containing one or more nitroaromatic compound(s) and wherein, preferentially, the Penicillium strain can metabolise the nitroaromatic compound. Advantageously, according to the method of the invention, this solution is an aqueous solution.

According to the invention, the, at least one, nitroaromatic compound may be a compound comprising at least one aromatic cycle comprising at least one nitro group and, if applicable, at least one function selected in the group comprising —OH, —COOH, a halogen, —NH$_2$, a cyclic or linear ose, a linear or ramified alkyl comprising 1 to 12 carbon atoms or an aryl, not substituted or substituted, by at least one function selected in the group comprising —OH, —COOH, a halogen, —NH$_2$, —OH.

For example, the, at least one, nitroaromatic compound may be a compound selected from nitrotoluene, dinitrotoluene, trinitrotoluene and their derivatives or a mixture of these compounds.

According to the invention, the method of the present invention may also comprise, before the contact step, a step consisting of neutralising the pH of the nitroaromatic compound solution or the soil such that the contact with the biomass, for example a Penicillium strain, can be performed at a pH of 4.5 to 6.5.

According to the invention, the contact may for example be performed in the presence of glucose at a concentration of 0.5 to 50 g of glucose/l of said solution.

According to the invention, the Penicillium strain may be a common Penicillium strain. For example, the Penicillium sp. LCM strain registered under the number I-2081 at Collection Nationale de Cultures de Microorganismes (CNCM) kept by Institut Pasteur in France may be used in the method according to the present invention. The invention also relates to the Penicillium sp. LCM strain registered under number I-2081 at the CNCM kept by Institut Pasteur in France.

According to the invention, the biomass of the Penicillium strain may be obtained using conventional microbiological methods to form a biomass, for example using Penicillium culture in a culture medium that is preferentially rich, solid or liquid, preferentially liquid, at a suitable temperature and pH to enable an optimal metabolism for the Penicillium strain.

A culture medium that can be used to develop the biomass is given in the examples below.

When a sufficient quantity of biomass is obtained, and when the culture medium is liquid, the biomass may for example be recovered by filtration or by centrifugation, advantageously by filtration.

Preferentially, in the method according to the present invention, the biomass is used fresh, which does not exclude any other use.

The biomass placed in contact with the solution or soil must be sufficient in quantity to enable the mineralisation of said nitroaromatic compound. The quantity of biomass may be determined for example as a function of the quantity of nitroaromatic compounds to be mineralised or the required mineralisation rate. This quantity of biomass may for example be determined using samples of the nitroaromatic compound solution mixed with variable quantities of biomass, at a suitable temperature and pH to enable a preferentially optimal metabolism of the Penicillium strain.

According to the invention, the contact may be carried out either by mixing the biomass and the nitroaromatic compound solution or by passing said solution through the biomass, said biomass being retained in, or on, a substrate such that said solution is able to pass through, to enable the mineralisation of the nitroaromatic compound it contains.

When the contact is carried out by mixing the biomass with the nitroaromatic compound solution, this contact may be carried out for example in a conventional reactor such as a fermenter, particularly comprising for example a system to stir or mix the solution and the biomass and a heating system. This type of contact is useful for example for a semi-continuous system, or batch system, for treating a nitroaromatic compound solution using the method according to the present invention.

When the contact is carried out by passing the nitroaromatic compound solution through the biomass, the biomass may be retained in, or on, a substrate. Indeed, advantageously, Penicillium in culture forms aggregates or pellets, making it possible to separate it easily from a solution, for example, by filtration.

According to the invention, the substrate may be for example a column or a conventional reactor enabling continuous passage of the nitroaromatic compound solution through the biomass, without carrying said biomass. The biomass may be retained for example by means of a grid, a fabric, or a mesh of organic or inorganic fibres which allows the passage of the solution, but not the biomass. This column or reactor may also comprise a system to stir the solution and the biomass and a heating system. This type of contact is useful for example for a system for the continuous treatment of a nitroaromatic compound solution using the method according to the present invention.

When the solution to be treated is a surface water, this contact may be carried out by simply dispersing the biomass and the Penicillium strain in the surface water.

According to the invention, when placed in contact with a nitroaromatic compound solution, the biomass may be mixed with the solution of said compound by means of a conventional stirrer, for example a rotary stirrer, and at a suitable stirring speed, for example from 50 to 250 rpm. The stirring may be maintained throughout the contact time between the Penicillium biomass and the nitroaromatic compound solution so as to optimise the contact.

According to the invention, the contact step is carried out under suitable conditions for a mineralisation of the nitroaromatic compound(s) by the Penicillium strain. Conventional preliminary Penicillium growth tests on samples of the nitroaromatic compound solution at different temperatures, the other parameters, for example the pH, being constant make it possible to determine this permissive temperature. It is important to note that Penicillium can develop even at a temperature of approximately 4° C. In this way, the method according to the present invention particularly offers the advantage of the possibility to use it in a wide temperature range.

This permissive temperature may be for example approximately 10 to 35° C., for example 15 to 35° C. The inventors noted satisfactory mineralisation at a temperature from 20 to 30° C., in particular at a temperature from 25 to 28° C. Advantageously, the temperature may be maintained practically constant during the contact time so as to optimise the mineralisation.

According to the invention, the contact step is preferentially carried out at a permissive pH for the Penicillium strain metabolism. Tests such as those mentioned above but at a constant temperature and at different pH values may be carried out to determine this permissive pH. Generally, this pH may be from 5 to 7.5, for example from 5 to 6 and for example approximately 5.5.

Naturally, the pH of the solution varies during the process according to the invention since the nitro groups of the nitroaromatic compound may be reduced during the mineralisation of said compound. This variation in the pH does not affect the method according to the present invention.

However, according to a variant of the present invention, the pH of the solution may be kept practically constant during the contact step, at the above-mentioned values, by means of a conventional buffer such as a phosphate or citrate buffer. This buffer may be added to the soil or to the solution before or during the contact step of the method according to the present invention.

According to the invention, the contact may be carried out in the presence of a source of carbon for the Penicillium strain. This source of carbon is a general Penicillium metabolism inductor, and it favours the mineralisation of the nitroaromatic compound by this micro-organism. This source of carbon may be added in sufficient quantity to optimise the Penicillium metabolism, particularly the mineralisation of the nitroaromatic compound. This source of carbon may be for example selected from the group comprising glucose, glucose polymers, molasses, corn hydrolysates, etc. The glucose polymers comprise for example starch. The source of carbon may be added for example to the solution to be treated in the reactor, or, in the case of surface water, or a soil, directly into said water or onto said soil.

In a continuous solution treatment system, the reactor may also comprise a system to supply the source of carbon to the reactor.

According to the invention, when the source of carbon is glucose, and the nitroaromatic compound solution is a saturated solution of said compound for example a saturated solution of TNT, DNT, a derivative of said compounds or a mixture of said compounds or their derivatives, the glucose concentration during contact, in the solution, may be advantageously from 2 to 25 g/l, for example 15 g/l.

An optimal concentration of the source of carbon may be determined for example by tests of the method according to the invention, on samples of the nitroaromatic compound solution such as those mentioned above.

According to the invention, the suitable conditions mentioned above may also comprise the addition of Penicillium regulating or inducing additives in the solution or on the soil to be treated, such as magnesium sulphate, sodium nitrate, potassium chloride, iron sulphates, etc., trace elements, and as a general rule any additive known to favour the Penicillium metabolism.

Advantageously, according to the method according to the invention, the contact is carried out such that there is optimum contact between the Penicillium and the solution and will preferentially comprise stirring when carried out in a reactor.

Excess Penicillium biomass may induce the formation of an aggregate, or "cake", which may have an adverse effect on the optimum contact between the micro-organism and the solution.

Advantageously, according to the present invention, the Penicillium biomass is placed in contact with the nitroaromatic compound solution at a concentration of 50 to 800 g in fresh biomass weight per litre of solution of said compound, for example approximately 150 g/l.

When the method according to the present invention relates to a method for eliminating a nitroaromatic compound present in a soil, the suitable conditions for a mineralisation of the, at least one, nitroaromatic compound present in said soil by the Penicillium strain are, of course, the favourable conditions for the Penicillium strain metabolism to mineralise the nitroaromatic strain to be eliminated. These conditions are particularly those described above.

It is also important to note that the Penicillium strain grows better in a wet medium.

Also, advantageously, this method according to the invention may comprise, before, during or after the step consisting of the contact of the soil to be treated with the biomass, a step consisting of the inundation of said soil with an aqueous solution, so as to form a nitroaromatic compound solution.

The method to mineralise a nitroaromatic compound in solution according to the invention and described above may then be applied.

Those skilled in the art will easily understand that the wetting of the soil may be natural, particularly by rainwater. In this case, the step consisting of the inundation of said soil with an aqueous solution will be carried out naturally with rainwater.

According to the invention, the contact of the soil, or the solution formed by inundating the soil, may be carried out by dispersing a Penicillium strain on the soil to be treated, advantageously a biomass of the Penicillium strain, before or after the inundation of said soil. Naturally, the soil may be inundated with an aqueous solution containing the Penicillium biomass.

A source of carbon, a pH buffer and an additive such as those described above may also be dispersed on the soil or during the contact with the Penicillium strain.

The method according to the invention is advantageous in relation to the methods of the prior art. Indeed, the inventors particularly demonstrated that the Penicillium strain made it possible to mineralise over 75% of an aromatic compound such as those described above, for example TNT, DNT and their derivative, easily, while the microbiological methods according to the prior art rarely exceed 10% mineralisation of said compounds. This mineralisation corresponds to a total or almost total degradation, or biodegradation of the nitroaromatic compound.

In addition, unexpectedly, the method according to the invention makes it possible to treat a solution with the above results even when it is saturated with nitroaromatic compound, i.e. it contains approximately 100 mg/l and up to 120 mg/l, of nitroaromatic compound, for example TNT, DNT and their derivatives. This concentration is very high and initially inhibited the use of a micro-organism to eliminate these compounds.

In addition, the method according to the invention is a non-polluting method since it generates little or no intermediate metabolites from the nitroaromatic compound(s), it does not require polluting chemicals and it uses a harmless micro-organism.

In addition, the method according to the invention is a very economical method, since it uses a micro-organism strain which is not expensive, commercially available and grows easily, even at temperatures of around 4° C.

In addition, Penicillium tends to form pellets which can be extracted very easily from a solution, for example by simple filtration, which facilitates treatments of solutions, such as industrial effluents, for example in continuous mode.

Numerous other advantages and characteristics of the present invention can be seen by those skilled in the art upon reading the following illustrative and non-restrictive examples, with reference to the appended figures.

BRIEF DESCRIPTION OF APPENDED FIGURES

FIGS. 1A and 1B are graphic representations illustrating the effect of glucose on the mineralisation of TNT with the method according to the invention, graph 1A representing the mineralisation of TNT without glucose and graph 1B the mineralisation of TNT in the presence of glucose;

FIGS. 1C and 1D are graphic representations of nitrite formation kinetics in the presence (FIG. 1D) or absence (FIG. 1C) of glucose;

EXAMPLES

Example 1

Penicillium Biomass Preparation

Figure 2:
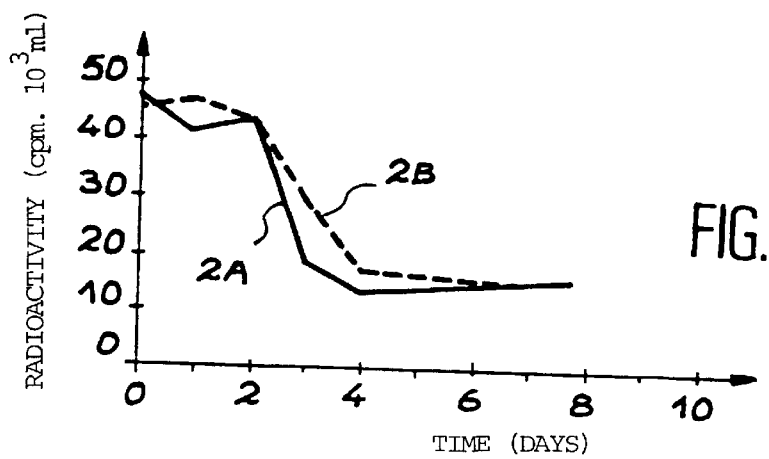
FIG. 2 is a graphic representation of the effect of the TNT concentration in the solution on the mineralisation of said solution using the method according to the present invention as a function of time in days.

The culture medium used for the biomass preparation is composed of 0.5 g/l of $KH_2PO_4$, 0.1 g/l of $K_2HO_4$, 30 g/l of glucose, 10 g/l of corn hydrolysate (brand: Corn Steep marketed by Societe des Produits du Mais), 0.5 g/l of $MgSO_4$, 2 g/l of $NaNO_3$, 0.5 g/l of KCl and 0.02 g/l of $FeSO_4$.

The Penicillium strain used, called Penicillium sp. LCM by the present inventors, was registered under the number I-2081 at the CNCM (Institut Pasteur, France).

The cultures are produced in Erlenmeyer flasks and stirred for three days at 250 rpm at a temperature of 27° C.

The biomass formed is then recovered by filtration.

Example 2

Elimination of Nitroaromatic Compounds Present in a Solution According to the Method of the Present Invention Nitroaromatic Compound Biodegradation Incubation and Analysis Conditions The nitroaromatic compounds in this example are trinitrotoluene (TNT), 2,4-dinitrotoluene and 2,6-dinitrotoluene.

A 62 g/l TNT solution in acetone was supplied to us by Societe Nationale des Poudres et Explosifs (Vert-Le-Petit, France).

The TNT uniformly labelled with $^{14}C$ is supplied by Chemsyn Science Laboratories, USA and has the following characteristics: 21.5 mCi/mmole-100 µCi/ml in water.

The 2,4-dinitrotoluene is supplied by Rhône-Poulenc (France) and 2,6-dinitrotoluene by Aldrich (Aldrich catalogue).

The nitroaromatic compounds are degraded with the fresh biomass prepared in example 1, on a 250 rpm rotary stirring table, in a thermostatically-controlled room at 27° C.

The nitroaromatic compound is added at a rate of 0.05 or 0.1 g/l in 7.5 g of fresh biomass resuspended in 50 ml of 1.5% glucose distilled water (15 g of glucose/litre of solution). Therefore, the fresh biomass is at a concentration of 150 g for 1 litre of solution.

Within the scope of the nitroaromatic compound mineralisation study, the experiments are performed in the presence of radiolabelled tracers (50 µl).

The degradation of the radiolabelled or non-radiolabelled TNT or 2,4 or 2,6-dinitrotoluenes is monitored using High Performance Liquid Chromatography (HPLC) at $k\lambda=254$ nm on a Hypercab (brand) porous graphite column supplied by Shandon, FRANCE, eluted with 80% acetonitrile, 0.05% trifluoroacetic acid and water.

The chromatographic system is composed of a Waters 717 (brand) injector, a Waters 600E (brand) pump (flow rate 1 ml/min), a Waters 486 (brand) UV detector operating at 220 nm supplied by WATER, FRANCE and a Monitor LB 506 C-1 (brand) radioactivity detector supplied by Berthold, FRANCE.

The total radioactivity is measured by counting using an LKB 1214 Rackbeta (brand) scintillation sensor supplied by Wallac.

The nitrite concentration is determined using the Griess method. In 96-well Elisa plates, 50 µl of sample under assay is mixed with 50 µl of Griess reagent (5% sulphanilamide in 2M HCl+0.5% of N-1-naphthylethylenediamine in 2M HCl, percentages expressed in V/V) in microplates.

After 20 minutes at ambient temperature, the absorbance at 540 nm is measured with an Elisa plate reader supplied by Dynatech.

The nitrites and nitrates were also analysed by HPLC on a Hypersyl ODS (brand) column supplied by Shandon: 5 mm, 4.6×250 mm by ion pairing: 10% 5 mM MeOH/PiC A (Waters), at 210 nm. The retention times are 4.9 minutes for nitrites and 6.0 minutes for nitrates. The concentrations are evaluated with reference to a calibration curve from 0 to 200 µM.

The TNT is analysed by thin layer chromatography (TLC) on a silica plate, in the presence of ethyl acetate eluent (Rf=0.87). The radioactivity associated with the different TLC tasks was measured using a Tracemaster 20 (brand) automatic linear thin layer analyser supplied by Berthold. Extraction of Transformation Products The incubation medium is centrifuged for 15 minutes at 10,000 rpm at 4° C. and then extracted three times with ethyl acetate. The recovered organic phase is dried on $MgSO_4$. After filtration, the solvent is eliminated in a Rotavapor. Purification on a semi-preparative silica plate is performed on a silica gel substrate. The different silica fractions loaded with transformation products are recovered and taken up in ethyl acetate. The silica is eliminated by filtration and the filtrate is evaporated and dried. The fractions recovered are then analysed.

1- Effect of glucose on the Mineralisation of TNT Using the Method According to the Invention The tests were performed in solutions comprising 100 mg/l of TNT, 150 g/l of fresh biomass, and a glucose concentration of variable g/l. The radioactivity after 5 days was measured in each test. FIGS. 1A and 1B appended are graphs illustrating the results of these measurements on which the Y-axis represents radioactivity after 16 days in counts per minute (cpm×$10^3$)/ml in the solution.

In FIGS. 1A and 1B, ▨ represents the initial radioactivity in the solution, ▢ represents the total radioactivity, ▨ represents the total radioactivity in the presence of HCl, ▨ represents the radioactivity associated with the supernatant, and ▨ represents the radioactivity associated with the biomass.

These FIGS. 1A and 1B show that glucose favours the mineralisation of TNT: 46.7% of mineralisation in the absence of glucose as opposed to 66.7% in the presence of glucose in 16 days of incubation under the above-mentioned conditions. The radioactivity initially associated with TNT is assimilated more significantly in the non-carbon source enriched medium. Therefore, glucose favours the mineralisation of TNT.

During these experiments, the nitrite concentration was measured. The presence of glucose in the incubation medium totally inhibits $NO_2-$ formation. However, in the absence of glucose, nitrite concentrations of approximately 230 µm, corresponding to 17.4% of nitrites liable to be formed from TNT by denitrification, are obtained.

Therefore, it appears that the denitrification which occurs under oxidising conditions, i.e. in the absence of reducing equivalents, i.e. glucose, is not necessarily favourable for mineralisation which appears to be favoured under reducing conditions, i.e. in the presence of glucose.

Nitrite formation kinetic measurements in the presence or absence of glucose were made on the solutions described above.

The results of these measurements were reported in FIGS. 1C and 1D appended: FIG. 1C illustrating the nitric formation kinetics in µm in the solution in the absence of glucose as a function of time in days and FIG. 1D illustrating the nitrite formation kinetics in µm in the solution in the presence of glucose as a function of time in days.

According to these results, it therefore appears that the denitrification which occurs under oxidising conditions, i.e. in the absence of glucose, is not necessarily favourable for mineralisation which appears to be favoured under reducing conditions, i.e. in the presence of glucose.

From the fifth day of incubation, the mineralisation of TNT by Penicillium sp. LCM stabilises. This stabilisation is sudden and occurs at a time when the biomass appears to have undergone little deterioration. A nutrient deficiency, toxicity of TNT or its metabolites with respect to the micro-organism or a loss of viability of the strain may induce a decrease in the catalytic activity and explain this inhibition.

2- Effect of Initial TNT Concentration on the Mineralisation of TNT with the Method According to the Invention The maximum solution of TNT in water at ambient temperature is 100 mg/l (saturation at ambient temperature). In order to check whether this concentration is not too high to enable total mineralisation of TNT or its derivatives, 2,4 and 2,6-DNT, we conducted incubations at 50 mg/l and 100 mg/l of TNT. The tests were performed at 27° C., with stirring at 150 rpm, in the presence of 150 g/l of fresh Penicillium biomass and 15 g/l of biomass.

The results of these measurements were reported in table II below.

TABLE II

| time in days | | 0 | 1 | 2 | 3 | 4 | 7 |
|---|---|---|---|---|---|---|---|
| 50 mg/l TNT solution | cpm* $10^3$/ml | 48 | 41 | 44 | 19 | 14 | 15 |
| 100 mg/l TNT solution | cpm* $10^3$/ml | 46 | 47 | 44 | 29 | 16 | 15 | cpm* = counts per minute - determined by a radioactivity measurement

FIG. 2 appended is a graph produced using these measurements on which the X-axis represents the time in days and the Y-axis the radioactivity measurement in counts per minute (cpm)/×$10^3$/ml. These results show that at 50 mg of TNT/l (curve referenced 2A in FIG. 2) and at 100 mg of TNT/l (curve referenced 2B in FIG. 2), the percentage of mineralisation of TNT by Penicillium is the same after 7 days of incubation and stabilises at approximately 70%.

3- Mineralisation of TNT

Tests were conducted as above, with a solution comprising 100 mg/ml of TNT in the presence of radiolabelled TNT on all the carbon atoms of the cycle. This solution also comprised 150 g/l of fresh Penicillium biomass as in example 1 above, and 15 g/l of glucose. The contact was carried out at a temperature of 27° C. with stirring at 150 rpm.

Table III below contains the measurements made for these tests.

TABLE III

| time in days | 0 | 1 | 2 | 4 | 6 | 7 | 8 | 10 |
|---|---|---|---|---|---|---|---|---|
| 100 mg/l of TNT (cpm* × $10^3$) | 52 | 21 | 19 | 7 | 8 | 9 | 10 | 10 | cpm*: see table II

Figure 3:
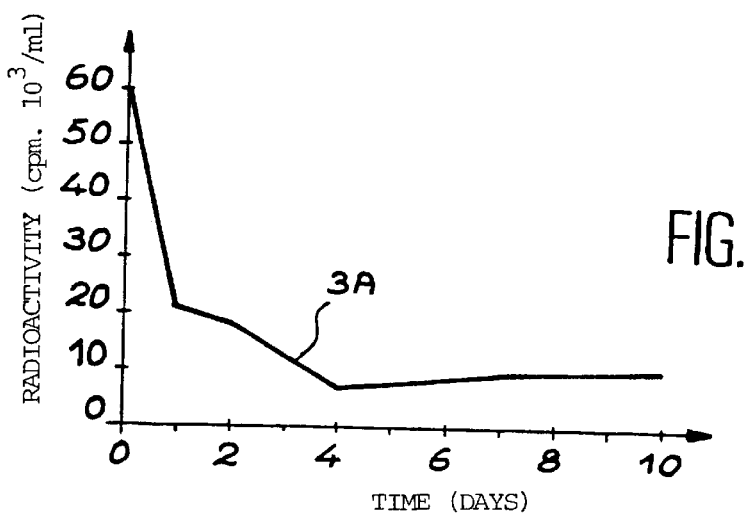
FIG. 3 is a graphic representation of TNT degradation in a solution according to the method of the invention.

FIG. 3 appended is a graph produced using these measurements on which the X-axis represents the time in days and the Y-axis the radioactivity measurement in counts per minute (cpm).

These results demonstrate 79% mineralisation of TNT in 10 days.

Figure 4:
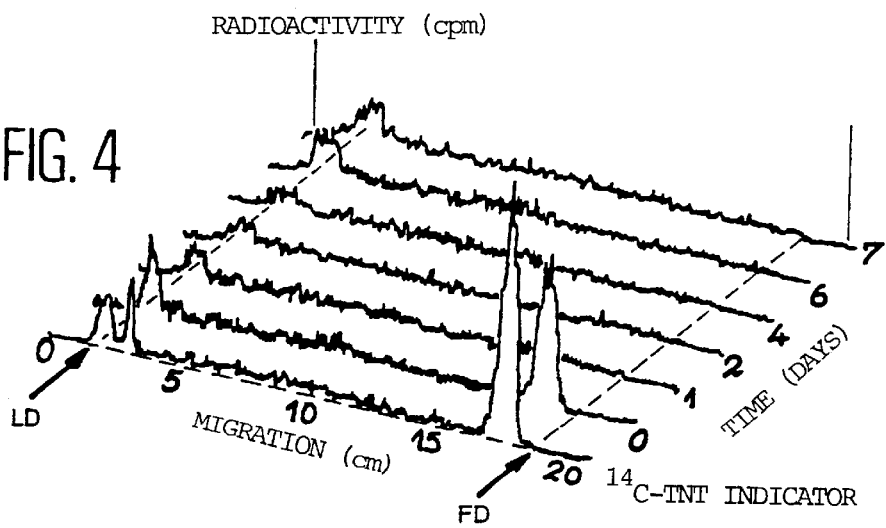
FIG. 4 is a diagram illustrating an identification of extractable metabolites formed during the mineralisation of TNT using the method according to the invention, with an analysis performed on a thin layer of silica combined with a radioactivity scanner on plates.

4- Identification of Extractable Metabolites Formed During the Mineralisation of TNT with the Method According to the Invention High performance liquid chromatography enabled us to demonstrate a total disappearance of TNT in 24 hours, with no appearance of known metabolites such as dinitrotoluene, amino-dinitrotoluene, diamino-nitrotoluene derived from TNT using a 100 mg/l TNT solution. This observation was confirmed by the analysis of the extracts (ethyl acetate) of the incubation medium by thin silica layer chromatography combined with a radioactivity scanner on plates. FIG. 4 appended is a diagram illustrating this analysis. Indeed, in the TLC solvent used, the residual radioactivity after 24 hours is completely associated with the deposition. It represents only 25 to 30% of the initial radioactivity and does not correspond to 2,4- or 2,6-DNT which, in this system, have Rf values of approximately 0.8.

Given the high percentage of TNT mineralisation, greater than 70%, the residual radioactivity in the supernatants is low and limits the detection of any metabolites. Therefore, we conducted preparative experiments on 1 litre of TNT at a concentration of 100 mg/l to extract a sufficient quantity of any residual compounds in order to characterise them. At the end of the reaction and despite several extractions, the overall yield is only approximately 20%. We isolated a majority compound (7%) of a molecular weight MW 182. This product which is not visible on the radioactive plate (Rf=0.4) described above is present at a concentration that is too low to be detected by the scanner. Although this molecular weight is the same as that of DNT, the isolated product is not DNT since the TLC Rf values are different.

5 - Conclusion

Therefore, the filamentous fungus of Penicillium sp. LCM enables a complete degradation of TNT and its derivatives such as 2,4 and 2,6-DNT in 100 mg/l solution in less than 24 hours, associated with over 70% mineralisation in 5 days. Such a mineralisation percentage at 100 mg/l of TNT and its derivatives such as 2,4 and 2,6-DNT has, to our knowledge, never been reported previously in the literature. The study of the influence of several factors made it possible to demonstrate that the absence of glucose inhibits TNT mineralisation slightly, but favours the denitrification of TNT and that the temperature and pH have an effect on the mineralisation of TNT and its derivatives such as 2,4 and 2,6-DNT.

Example 3: elimination of nitroaromatic compounds present in a soil according to the method of the present invention A soil containing TNT could be inundated with an aqueous solution containing a 50 mM phosphate buffer and starch as a source of carbon.

A Penicillium biomass may be prepared as in example 1 and then distributed onto the soil.

In another test, the solution intended to inundate the soil may contain the 50 mM phosphate buffer, starch and the biomass.

What is claimed is:

1. Microbiological method for eliminating at least one nitroaromatic compound present in a solution or in a soil, characterized in that it comprises a step consisting of placing said solution or said soil in contact with a biomass of a Penicillium strain under suitable conditions for mineralization of said nitroaromatic compound by the Penicillium strain, in the presence of a source of carbon for the Penicillium strain wherein the Penicillin strain is registered as 1-2081 at the CNCM kept by Institute Pasteur in France.

2. Method according to claim 1 for eliminating at least one nitroaromatic compound present in a soil, also comprising a step consisting of the inundation of said soil with an aqueous solution, so as to form a nitroaromatic compound solution.

3. Method according to claim 1 for eliminating at least one nitroaromatic compound present in a solution, wherein the contact is carried out either by mixing the biomass and the nitroaromatic compound solution or by passing said solution through the biomass, said biomass being retained in, or on, a substrate such that said solution is able to pass through, to enable the mineralisation of the nitroaromatic compound it contains.

4. Method according to claim 1 for eliminating at least one nitroaromatic compound present in a solution, wherein the nitroaromatic compound solution is an aqueous solution of said compound.

5. Method according to claim 1, wherein the nitroaromatic compound solution is a laboratory solution, an industrial effluent or surface water.

6. Method according to claim 1, wherein the contact step is carried out at a permissive temperature for the Penicillium strain metabolism.

7. Method according to claim 1, wherein the source of carbon is selected from the group consisting of glucose, glucose polymers, molasses and corn hydrolysates.

8. Method according to claim 1, wherein the contact is carried out in the presence of glucose at a concentration of 0.5 to 50 g of glucose/l of said solution.

9. Method according to claim 1, wherein the Penicillium biomass is placed in contact with the nitroaromatic compound solution at a concentration of 50 to 800 g in fresh biomass weight per liter of solution of said compound.

10. Method according to claim 1, wherein the, at least one, nitroaromatic compound is a compound comprising at least one aromatic cycle comprising at least one nitro group and, if applicable, at least one function selected from the group consisting of —OH, —COOH, a halogen, —NH2, a cyclic or linear ose, a linear or ramified alkyl comprising 1 to 12 carbon atoms and an aryl, not substituted or substituted, by at least one function selected from the group consisting —OH, —COON, a halogen, —NH$_2$, —OH.

11. Method according to claim 1, wherein the, at least one, nitroaromatic compound is a compound selected from nitrotoluene, dinitrotoluene, trinitrotoluene and their derivatives or a mixture of these compounds.

12. The method according to claim 1, further comprising, before the contact step, a step consisting of neutralising the pH of the nitroaromatic compound solution or the soil such that the contact with the biomass can be performed at a pH of 4.5 to 6.5.

13. An isolated Penicillium sp. type strain, wherein said Penicillium sp. type strain is registered under number 1-2081 at the CNCM and is kept at Institut Pasteur in France.

* * * * *